United States Patent
Riedl et al.

(10) Patent No.: US 8,833,795 B2
(45) Date of Patent: Sep. 16, 2014

(54) DEVICE FOR DAMPING THE VIBRATIONS IN A CRAWLER OR TRACKED VEHICLE

(71) Applicant: Rheinmetall Landsysteme GmbH, Kiel (DE)

(72) Inventors: Juergen Riedl, Koenigsbrunn (DE); Hans Mall, Fuerstenfeldbruck (DE)

(73) Assignee: Rheinmetall Landsysteme GmbH, Kiel (DE)

( * ) Notice: Subject to any disclaimer, the term of this patent is extended or adjusted under 35 U.S.C. 154(b) by 0 days.

(21) Appl. No.: 13/691,675

(22) Filed: Nov. 30, 2012

(65) Prior Publication Data

US 2013/0161927 A1  Jun. 27, 2013

Related U.S. Application Data

(63) Continuation of application No. PCT/EP2011/002630, filed on May 27, 2011.

(30) Foreign Application Priority Data

May 31, 2010 (DE) .......................... 10 2010 022 296

(51) Int. Cl.
| | | |
|---|---|---|
| *B62D 7/22* | (2006.01) | |
| *B62D 21/00* | (2006.01) | |
| *B60G 17/02* | (2006.01) | |
| *B60G 3/14* | (2006.01) | |
| *B60G 11/18* | (2006.01) | |
| *B62D 55/108* | (2006.01) | |
| *B60G 11/20* | (2006.01) | |
| *F16F 15/06* | (2006.01) | |

(52) U.S. Cl.
CPC .......... *B62D 55/1083* (2013.01); *B60G 17/025* (2013.01); *B60G 2202/1351* (2013.01); *B60G 3/14* (2013.01); *B60G 11/183* (2013.01); *B60G 2204/419* (2013.01); *B60G 11/20* (2013.01); *B60G 11/181* (2013.01); *B60G 2200/132* (2013.01); *B60G 2202/132* (2013.01); *B60G 2206/427* (2013.01); *B60G 2300/36* (2013.01); *B60G 11/185* (2013.01); *B60G 11/18* (2013.01); *B60G 2300/32* (2013.01); *F16F 15/06* (2013.01); *B60G 2500/20* (2013.01)
USPC ......................................... 280/684; 280/679

(58) Field of Classification Search
USPC .................................................. 280/679, 684
See application file for complete search history.

(56) References Cited

U.S. PATENT DOCUMENTS

| | | | |
|---|---|---|---|
| 2,463,040 A | 3/1949 | MacPherson | |
| 2,705,635 A | 4/1955 | Utz | |

(Continued)

FOREIGN PATENT DOCUMENTS

| | | |
|---|---|---|
| CH | CH 235 421 A | 11/1944 |
| DE | 28 18 226 A1 | 11/1978 |

(Continued)

*Primary Examiner* — Toan To
(74) *Attorney, Agent, or Firm* — Muncy, Geissler, Olds & Lowe, P.C.

(57) ABSTRACT

A device for damping vibrations acting on a tracked vehicle is provided, which has a front and rear track roller. Torsion springs are mounted along a vehicle pan. Alternatively, the torsion springs can be subdivided into smaller torsion springs. For the immediate track rollers, a further device is provided in which the long torsion springs which hitherto absorbed the torsion are divided into a plurality of smaller torsion springs and mounted not transversely with respect to the vehicle pan, but in a direction of travel with respect thereto. The torsion springs are functionally connected to one another via drive and/or transmission elements, and are accommodated outside an interior space. In this way, no further installation space is required transversely with respect to and below the vehicle pan, at most in the side region or within a small recess in the pan, a so-called pan niche.

23 Claims, 5 Drawing Sheets

(56) References Cited

U.S. PATENT DOCUMENTS

| | | | |
|---|---|---|---|
| 3,994,352 A * | 11/1976 | Siorek | 180/9.1 |
| 4,043,417 A | 8/1977 | Orpana | |
| 4,194,761 A * | 3/1980 | Falk et al. | 280/124.129 |
| 5,178,405 A * | 1/1993 | Brandstadter | 280/5.515 |
| 5,697,463 A | 12/1997 | Schlegl | |
| 5,909,780 A * | 6/1999 | De Andrade | 180/9.58 |
| 6,527,072 B1 | 3/2003 | Schlegl et al. | |
| 6,840,338 B2 * | 1/2005 | Bowers et al. | 180/9.54 |
| 7,017,688 B2 * | 3/2006 | Bowers et al. | 180/9.54 |
| 7,597,411 B2 * | 10/2009 | Bodin et al. | 305/143 |
| 2009/0124142 A1 * | 5/2009 | Wernicke et al. | 440/12.63 |
| 2009/0321152 A1 * | 12/2009 | Arulraja et al. | 180/9.62 |
| 2011/0227309 A1 * | 9/2011 | Arulraja et al. | 280/124.116 |

FOREIGN PATENT DOCUMENTS

| | | |
|---|---|---|
| DE | 41 23 778 A1 | 4/1992 |
| DE | 103 28 541 A1 | 1/2005 |
| DE | 10 2008 026 680 A1 | 12/2009 |
| EP | 0 937 634 A1 | 8/1999 |
| EP | 1 117 555 B2 | 11/2006 |
| FR | 1 349 711 A | 1/1964 |
| GB | 556 241 A | 9/1943 |
| JP | 5-155225 | 6/1993 |
| WO | WO 92/10375 | 6/1992 |

\* cited by examiner

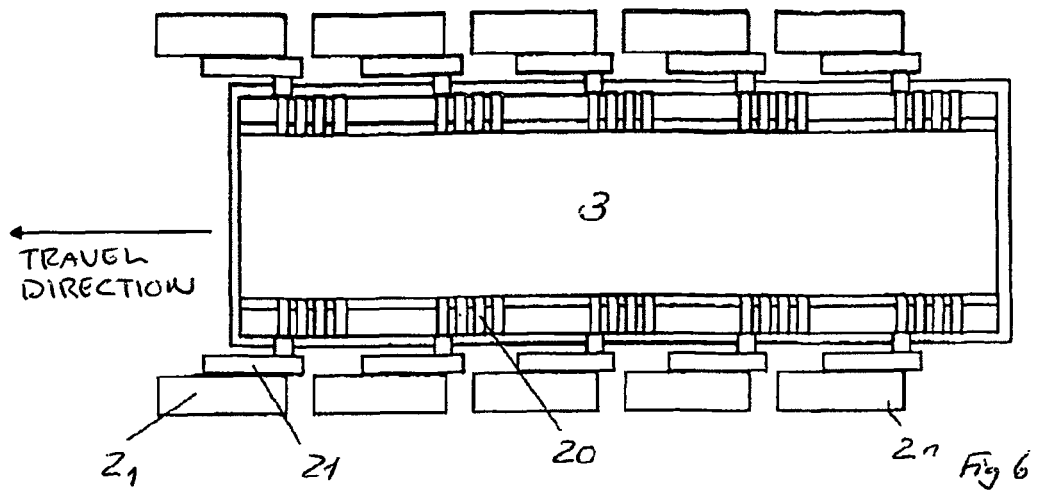
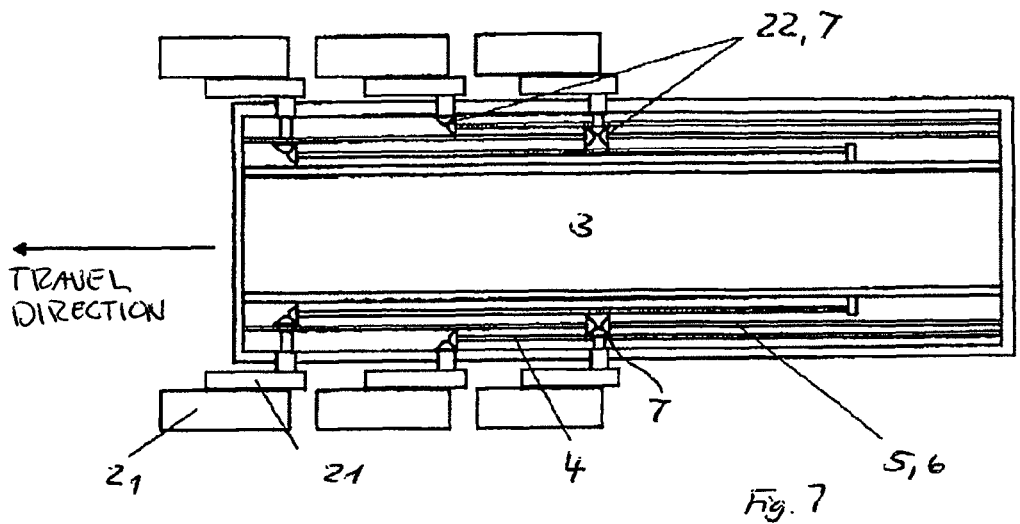
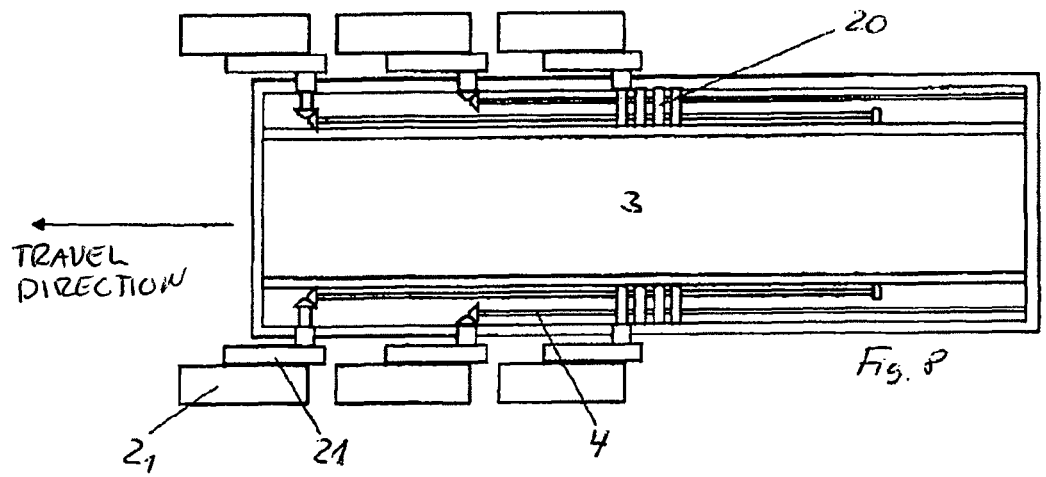

DEVICE FOR DAMPING THE VIBRATIONS IN A CRAWLER OR TRACKED VEHICLE

This nonprovisional application is a continuation of International Application No. PCT/EP2011/002630, which was filed on May 27, 2011, and which claims priority to German Patent Application No. DE 10 2010 022 296.8, which was filed in Germany on May 31, 2010, and which are both herein incorporated by reference.

BACKGROUND OF THE INVENTION

1. Field of the Invention

The invention relates to damping, particularly of individual track rollers of a crawler or tracked vehicle and proposes dividing long torsion bar springs, used thus far, into a plurality of small torsion bar springs to thereby reduce the installation space and to pass in particular the torsion bar springs of the front and rear track wheel not below the pan but to place them on the side along the pan.

2. Description of the Background Art

DE 41 23 778 C2, which corresponds to U.S. Pat. No. 5,697,463, discloses efforts to dispose entire track components on a track carrier in the form of modules, which are connected together by tension and/or torque struts, which in turn are disposed below or above the bottom plate of the vehicle pan transverse to the longitudinal axis of the vehicle.

In a continuation of approaches of this type, it is proposed in EP 1 117 555 B2, which corresponds to U.S. Pat. No. 6,527,072, that the entire drive unit is mounted in a corresponding side wall of the vehicle pan directly or via annular spacers, so that for the prior efforts an installation space is no longer needed below or above the bottom plate. The static components of the drive unit on their part are vibrationally uncoupled from the vehicle pan by vibration damping means. In practice this solution could not be accepted on a large scale.

Accordingly, parallel approaches are known from the state of the art to use hydraulic cylinders to transfer the damping in this way to the outside as well. Thus, DE 29 47 974 A1 discloses a stabilizing arrangement for a pan structure carried by a track drive of a tracked vehicle, whose hydraulic shock-absorbing means support the track rollers of the track drive.

A hydropneumatic element and the use in a vehicle with a drive and track rollers can also be derived from DE 103 28 541 A1, which is incorporated herein by reference.

Even when approaches are proposed, as to how to counteract the temperature development in such a cylinder, e.g., DE 10 2008 026 680 A1, which is incorporated herein by reference, or to provide movement-dependent damping, the temperature problem remains a functional problem.

SUMMARY OF THE INVENTION

It is therefore an object of the invention to provide a space-saving device for damping vibrations.

In an embodiment, the integration of the torsion bar springs is not below the pan transverse to a direction of travel, but along a vehicle pan, therefore virtually parallel thereto. In a continuation of the invention, the long, torsion-absorbing torsion bar springs of the intermediate track rollers are divided into a plurality of smaller torsion bar springs and oriented in the direction of travel or attached to the vehicle pan. These are functionally connected to one another by known drive or transmission elements and are accommodated outside the interior space. As a result, installation space for the damping device is no longer needed transverse to and below the vehicle pan, at most in the side region or within a small recess in the pan, a so-called pan niche. A further alternative is the dividing of the torsion bars and their preferably parallel orientation to one another to create a damping device at least for the middle wheels.

In an embodiment, the damping of the individual track rollers is realized according to the state of the art by means of a torsion bar spring. In this regard, said spring is connected over the entire width of the vehicle pan torsionally rigid on the one side to the pan housing and on the other to the rotatably mounted support arm of the track roller. To achieve a torsion angle of about 100°, the length of the torsion bar springs is about 2-2.5 m. Because the torsion bar springs are mounted above the pan bottom and protected by a cover (torsion bar tunnel), the usable height in the interior is thereby considerably reduced and has the result that access and the presence of a crew from a specific body height are only possible to a limited extent.

If a torsion (rotation) of 40° is to be absorbed, it is distributed to the individual torsion bars in such a way that, for example, in the case of four identical torsion bars each takes up 10° and in the case of, for example, five torsion bars each torsion bar or each torsion bar spring tube then takes up 8° of the rotation. Different torsion bars are also possible, however. Nevertheless, the advantage of identical, therefore equal torsion bars is that they absorb the rotation to the same degree and the rotation is thereby uniformly distributed.

The division of the torsion bar springs of the intermediate track rollers both the front and rear rollers can occur in the form of a series connection, in the form of a parallel connection, and in combinations of both forms.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows a plan view of the divided torsion bars of FIG. 3;

FIG. 7 shows a plan view of the variant of whole or divided torsion bars integrated lengthwise; and FIG. 8 shows a plan view of the combination of the torsion bar integrations.

DETAILED DESCRIPTION

Figure 1:
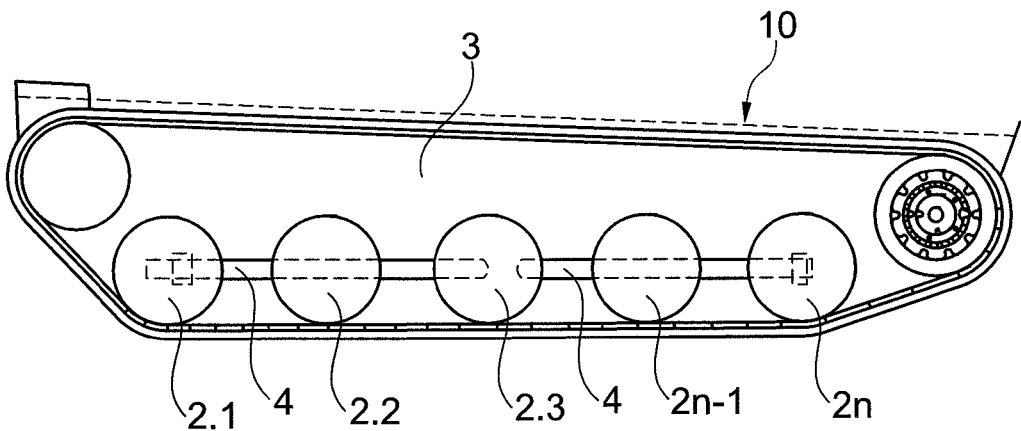
FIG. 1 shows an illustration of the longitudinal torsion bar arrangement along a vehicle pan.

In FIG. 1, a device for damping vibrations of a track drive with a plurality of track wheels or rollers $2_n$ of a crawler or tracked vehicle 10 (shown schematically) is labeled with the number 1; it is attached along a vehicle pan 3 and is connected, on the one hand, to the first or last track wheel $2_1$, $2_n$ and, on the other, to vehicle pan 3. In this case, a lengthwise integrated torsion bar (torsion bar spring) 4 is used, which is attached lengthwise in the direction of travel to vehicle pan 3.

In addition to the damping of the first and last wheel $2_1$, $2_n$, depending on the length of pan 3, also the second or next-to-last wheel can be taken up via one torsion bar 4 each, whose torsion movement is started via the already mentioned transmission means.

Figure 2:
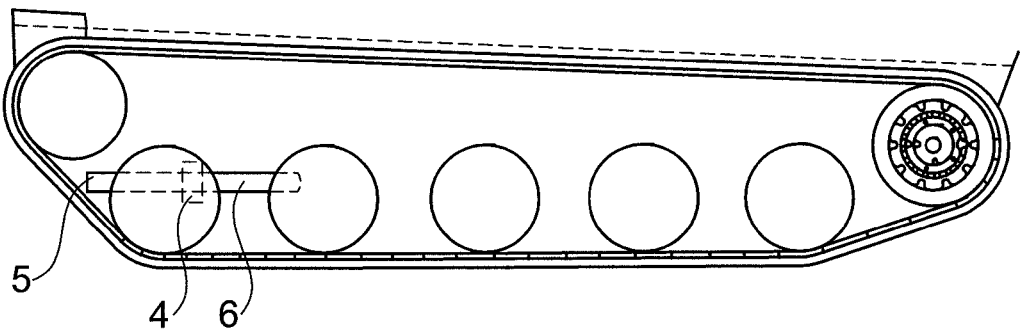
FIG. 2 shows an illustration of a longitudinal torsion bar arrangement of FIG. 1 in the form of a series connection of a plurality of torsion bars.
Figure 2A:
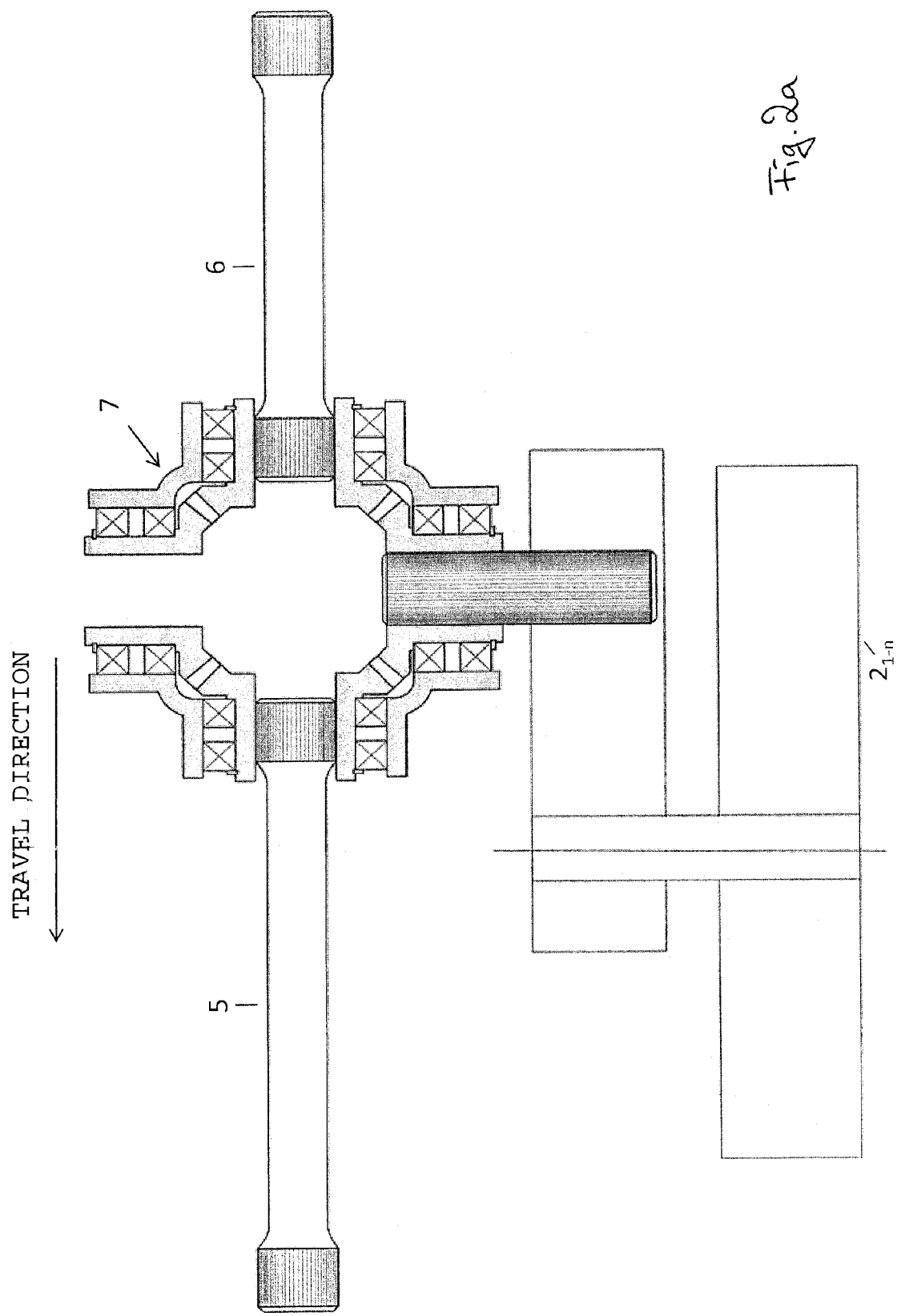
FIG. 2a shows an illustration of a transmission component or connecting component.

However, if the length is not sufficient, the torsion bars of the remaining wheels $2_1$ to $2_{n-1}$ are preferably divided (FIG. 2). Device 1' in this embodiment includes a series connection of at least two, preferably a plurality of torsion spring bars 5, 6. In this case, both torsion spring bars 5, 6 can be functionally connected to one another via a drive or transmission means 7. Said transmission or connection means 7 are freely selectable and can be, for example, toothed belts, gear wheels, lever mechanisms, chains, or the like (FIG. 2a).

Figure 3:
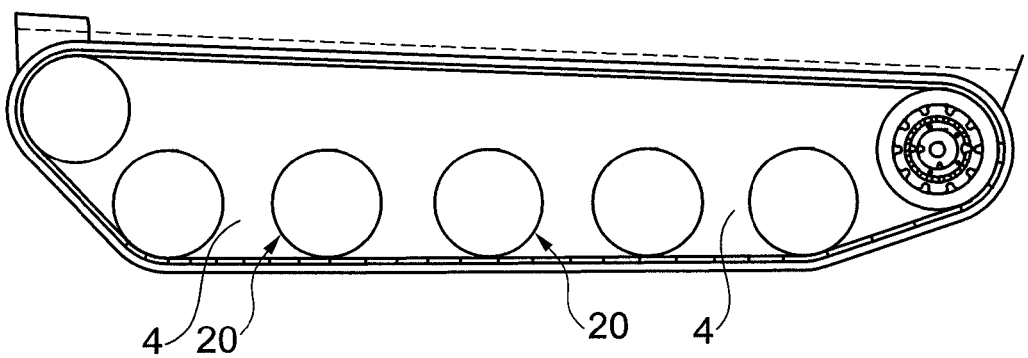
FIG. 3 shows an illustration of the combination of the longitudinal torsion bar arrangement with a further damping device.

It can be provided in a continuation that a device 20 is integrated particularly for intermediate track wheels $2_2$ to $2_{n-1}$ (FIG. 3), whereby here a plurality of torsion bars 11-14, but at least two bars, are functionally connected to one another by means 15-17, for example, gear wheel pairs. Torsion bar 11 in this case is functionally connected via gear wheel pair 15 to torsion bar 12, which is functionally connected in turn via gear wheel pair 16 to torsion bar 13. Gear wheel pair 17 then connects torsion bar 14 to torsion bar 13. Each of these torsion bars 11-14 rotates by this arrangement (FIG. 4 and FIG. 5).

Torsion bar springs 11-14 are preferably identical in their lengths as well. If a track carrier or a track roller $2_2$ to $2_{n-1}$ was previously dampened via a 2000 mm-long torsion bar spring, which allowed a torsion angle of 100°, for example, four identical torsion bars 11-14 with a length of, for example, 550 mm are now integrated in the novel device 1. The first torsion bar 11 is connected to a support arm 21 of the track roller, here $2_2$, and the last torsion bar 14 is mounted in pan housing 3. Each torsion bar spring 11-14 for its part then takes up a rotation of 25°. (Variable and thereby different lengths of torsion bars are likewise possible, but because of connection means of torsion bars among one another then increase the structural design, when these torsion bars are oriented exclusively parallel to one another.)

Figure 4:
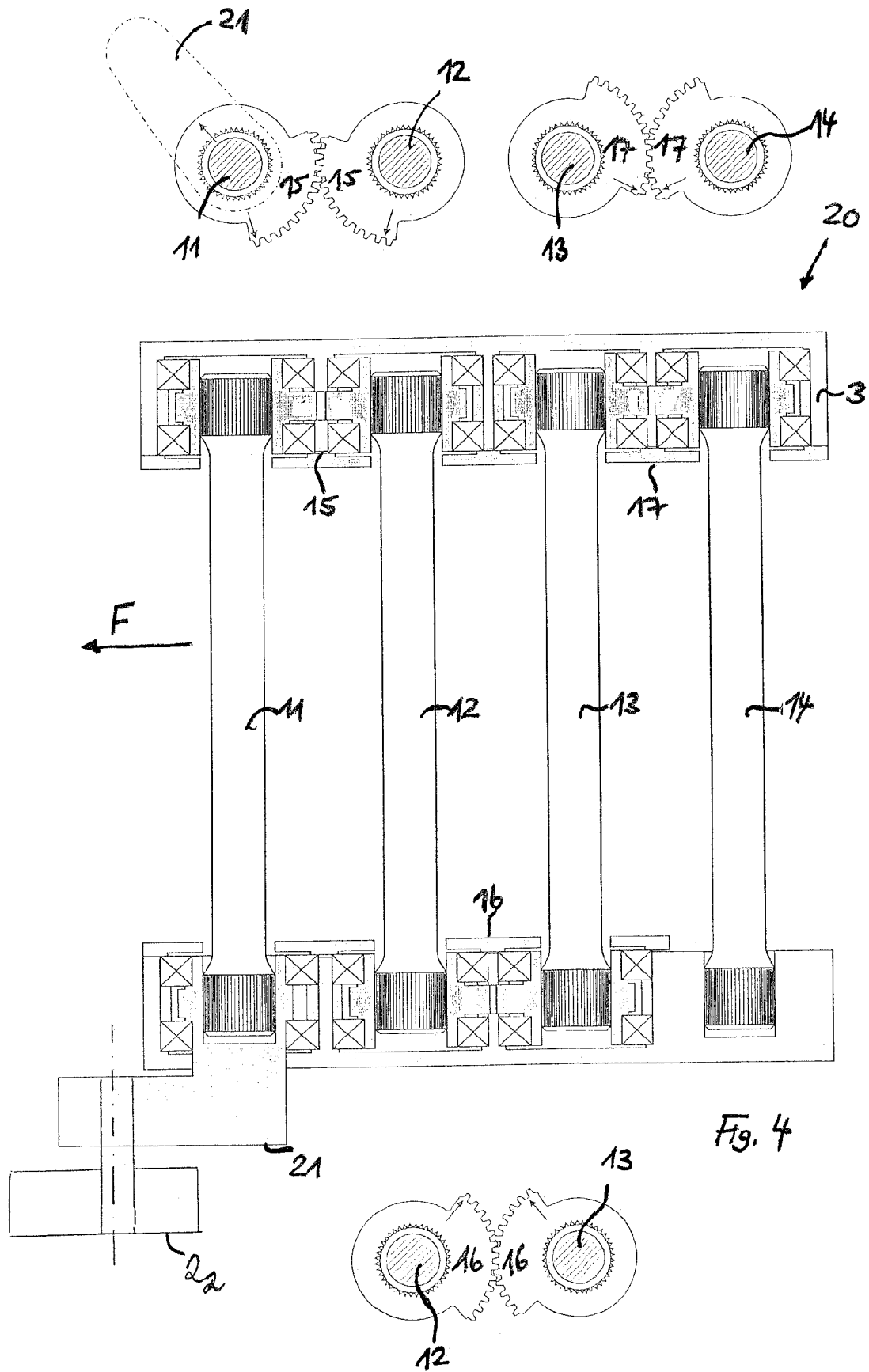
FIG. 4 shows a torsion bar structure with a plurality of torsion bars of FIG. 3 disposed in parallel—stressed.
Figure 5:
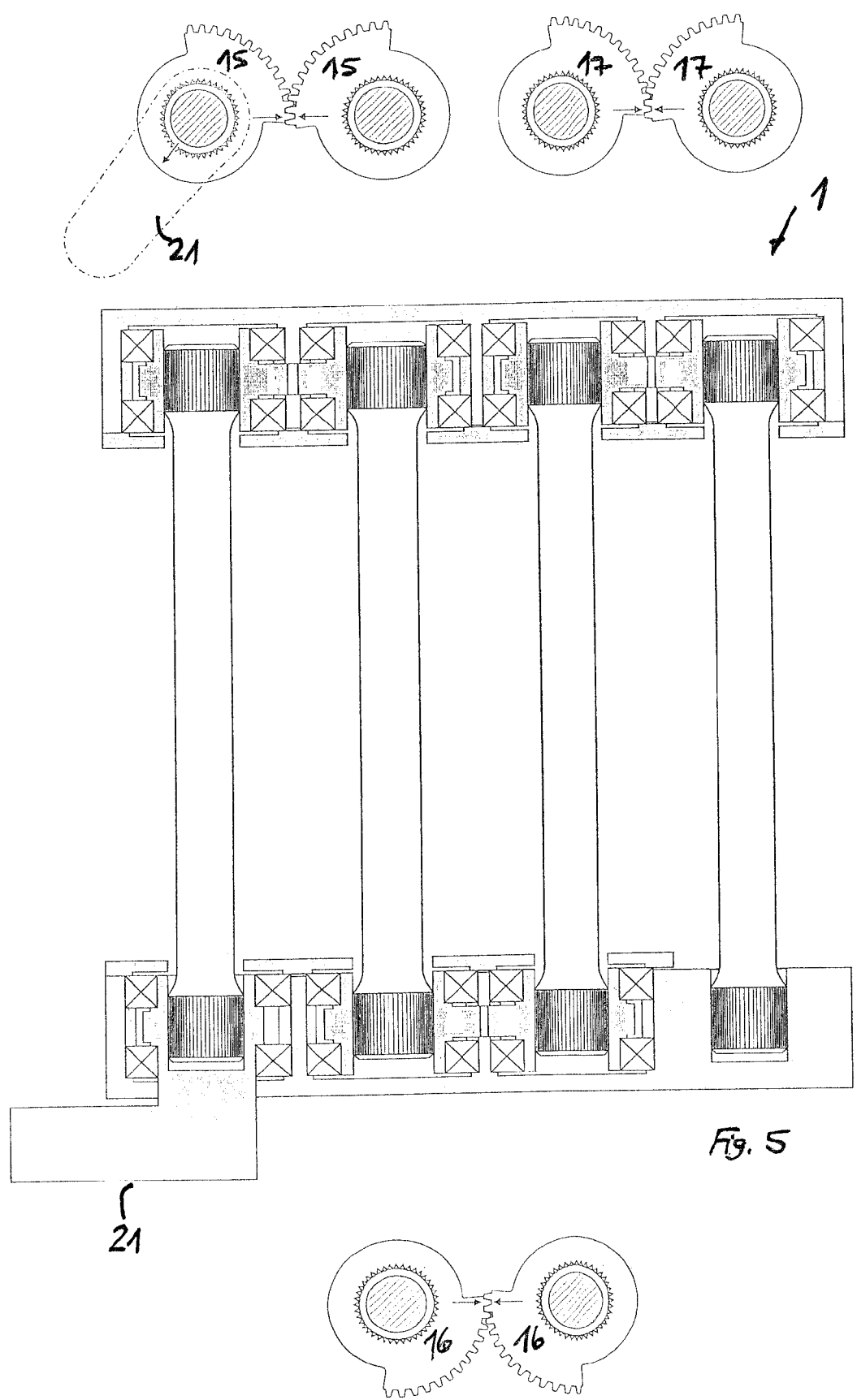
FIG. 5 shows the torsion bar structure of FIG. 4—unstressed.

Torsion bars 11-14 in FIG. 4 are stressed and are shown unstressed in FIG. 5.

Depending on the space requirement, the torsion bars in this device 20 can also be arranged in a series connection, parallel connection, and also combined in a parallel and series connection.

FIGS. 6 to 8 show in a plan view the different variants and options of integrating torsion bars 4, 5, 6 and device 20, include a plurality of bars 11-14, between the respective support arm 21 and the vehicle pan 3 (sketched in). It is also evident that there is in each case a transmission or angle gear 7 or 22 between the ground-side torsion bars 4 and the divided side torsion bars 5 and 6 and support arms 21.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for damping vibrations in a crawler or tracked vehicle via a torsion or torsion spring bars, the device comprising
    a front track roller; and
    a rear track roller, the front track roller and rear track roller are mounted on a vehicle pan via a torsion spring bar integrated lengthwise along the pan of the tracked vehicle.

2. The device according to claim 1, wherein a second and/or next-to-last track roller is mounted via a torsion spring bar disposed along the vehicle pan.

3. The device according to claim 1, wherein the torsion spring bar is integrated lengthwise in a direction of travel with respect to the vehicle pan.

4. The device according to claim 1, wherein the torsion spring bar is rigidly connected at one end to the vehicle pan and connected at another end to the front track roller or the rear track roller.

5. The device according to claim 4, wherein the another end of the torsion spring bar is connected to a rotatably mounted support arm of the front track roller or the rear track roller.

6. A device for damping vibrations in a crawler or tracked vehicle via a torsion or torsion spring bars, the device comprising
    a front track roller; and
    a rear track roller, the front track roller and rear track roller are mounted on a vehicle pan via a torsion spring bar integrated along the pan of the tracked vehicle,
    wherein the torsion spring bar is formed by a series connection of at least two torsion spring bars, which are functionally connected to one another via a transmission element.

7. The device according to claim 6, wherein the torsion spring bars are substantially identical and/or different, in their length as well.

8. A device for damping vibrations in a crawler or tracked vehicle via a torsion or torsion spring bars, the device comprising
    a front track roller; and
    a rear track roller, the front track roller and rear track roller are mounted on a vehicle pan via a torsion spring bar integrated along the pan of the tracked vehicle,
    wherein an additional damping device is provided at least for the mounting of intermediate track rollers.

9. The device according to claim 8, wherein the device further comprises a plurality of smaller or shorter torsion spring bars, which, viewed in a direction of travel, are oriented to the vehicle pan and are functionally connected to one another via drive and/or transmission elements.

10. The device according to claim 9, wherein the torsion spring bars of the additional damping device are arranged in series and/or parallel to one another.

11. A device for damping vibrations in a crawler or tracked vehicle via a torsion or torsion spring bars, the device comprising
    a front track roller; and
    a rear track roller, the front track roller and rear track roller are mounted on a vehicle pan via a torsion spring bar integrated along the pan of the tracked vehicle,
    wherein the first torsion spring bar is attached to a support arm of the track roller and the last torsion spring bar is mounted in the pan housing.

12. A device for damping vibrations in a crawler or tracked vehicle via a torsion or torsion spring bars, the device comprising
   a front track roller; and
   a rear track roller, the front track roller and rear track roller are mounted on a vehicle pan via a torsion spring bar integrated along the pan of the tracked vehicle,
   wherein the drive and/or transmission elements are freely selectable and are toothed belts, gear wheels, lever mechanisms, or chains.

13. A device comprising:
   a front track roller;
   a rear track roller; and
   a torsion spring bar extended along a vehicle pan of a tracked vehicle, the torsion spring bar comprising:
      a first end connected to the front track roller or the rear track roller; and
      a second end connected to the vehicle pan,
   wherein the front track roller and the rear track roller are mounted on the vehicle pan via the torsion spring bar.

14. The device according to claim 13, wherein the torsion spring bar is connected over an entire width of the vehicle pan.

15. The device according to claim 13, wherein the front track roller and the rear track roller comprises a rotatably mounted support arm.

16. The device according to claim 15, wherein the first end of the torsion spring bar is connected to the support arm of the front track roller or the rear track roller and the second end of the torsion spring bar is torsionally, rigidly connected to the vehicle pan.

17. The device according to claim 13, wherein a length of the torsion spring bar is in a range of 2-2.5 m.

18. The device according to claim 13, wherein the torsion spring bar is mounted above a bottom of the vehicle pan.

19. The device according to claim 13, further comprising a cover covering the torsion spring bar.

20. The device according to claim 13, wherein the torsion spring bar comprises plural torsion spring bars connected in series along the vehicle pan.

21. The device according to claim 20, wherein the torsion spring bars are functionally connected via a transmission member.

22. The device according to claim 20, wherein the torsion spring bars are identical in length.

23. A vehicle comprising:
   a vehicle pan;
   a vehicle track drive comprising:
      a front track roller; and
      a rear track roller; and
   a damping device attached along the vehicle pan, the damping device comprising:
      a torsion spring bar extended along the vehicle pan, the torsion spring bar comprising:
         a first end connected to the front track roller or the rear track roller; and
         a second end connected to the vehicle pan,
   wherein the front track roller and the rear track roller are mounted on the vehicle pan via the torsion spring bar.

* * * * *